US010068136B2

(12) United States Patent
Heier et al.

(10) Patent No.: US 10,068,136 B2
(45) Date of Patent: *Sep. 4, 2018

(54) EVENT DETECTION BASED ON VIDEO METADATA

(71) Applicant: Verint Americas Inc., Alpharetta, GA (US)

(72) Inventors: Kurt Heier, Golden, CO (US); Josh O'dell, Lakewood, CO (US); Jon Legendre, Johnstown, CO (US); Derek Shoaf, Arvada, CO (US)

(73) Assignee: Verint Americas Inc., Alpharetta, GA (US)

( * ) Notice: Subject to any disclaimer, the term of this patent is extended or adjusted under 35 U.S.C. 154(b) by 245 days.

This patent is subject to a terminal disclaimer.

(21) Appl. No.: 14/996,885

(22) Filed: Jan. 15, 2016

(65) Prior Publication Data

US 2016/0210515 A1    Jul. 21, 2016

Related U.S. Application Data

(63) Continuation of application No. 11/844,759, filed on Aug. 24, 2007, now Pat. No. 9,269,244.

(60) Provisional application No. 60/918,375, filed on Mar. 16, 2007, provisional application No. 60/893,346, filed on Mar. 6, 2007.

(51) Int. Cl.
| | |
|---|---|
| *H04N 7/18* | (2006.01) |
| *G06K 9/00* | (2006.01) |
| *G06Q 20/20* | (2012.01) |
| *G07G 1/14* | (2006.01) |
| *G07G 3/00* | (2006.01) |
| *G08B 13/196* | (2006.01) |
| *G06Q 30/00* | (2012.01) |

(52) U.S. Cl.
CPC ..... *G06K 9/00718* (2013.01); *G06K 9/00369* (2013.01); *G06K 9/00771* (2013.01); *G06Q 20/20* (2013.01); *G06Q 30/0185* (2013.01); *G07G 1/14* (2013.01); *G07G 3/00* (2013.01); *G07G 3/003* (2013.01); *G08B 13/19671* (2013.01); *G06K 2009/00738* (2013.01)

(58) Field of Classification Search
CPC .......... G06Q 20/20; G07G 1/14; G07G 3/003; G07G 3/00; G08B 13/19671
USPC ...................................................... 348/150
See application file for complete search history.

(56) References Cited

U.S. PATENT DOCUMENTS

| | | | | |
|---|---|---|---|---|
| 6,877,134 B1 * | 4/2005 | Fuller | ............... | G06F 17/30265 707/999.104 |
| 7,403,115 B2 * | 7/2008 | Yuzik | ..................... | G07F 19/20 340/540 |
| 7,920,626 B2 * | 4/2011 | Fernandez | ....... | G08B 13/19608 375/240.16 |
| 2007/0282665 A1 * | 12/2007 | Buehler | ................. | G06Q 30/02 705/7.29 |

* cited by examiner

*Primary Examiner* — Joseph L Greene
(74) *Attorney, Agent, or Firm* — Meunier Carlin & Curfman

(57) ABSTRACT

Video data from sources, such as cameras, is analyzed to create metadata descriptive of the events and objects occurring in the video. This metadata, which consists of data about the video, is then analyzed on a transaction basis to determine if a suspicious activity, such as a fraudulent Point of Sale (POS) return event, has occurred in relation to a transaction.

14 Claims, 13 Drawing Sheets

EVENT DETECTION BASED ON VIDEO METADATA

CROSS-REFERENCE TO RELATED APPLICATIONS

This Application is a continuation of U.S. patent application Ser. No. 11/844,759, filed Dec. 27, 2011, which claims benefit under 35 U.S.C. 119(e) from U.S. Provisional Application No. 60/893,346, filed Mar. 6, 2007 and U.S Provisional Application No. 60/918,375, filed Mar. 16, 2007, each of which is incorporated by reference herein in its entirety.

BACKGROUND OF THE INVENTION

1. Field of the Invention

This invention relates generally to the field of video information analysis and in particular fraud detection using an intelligent video monitoring system, for example, relating to point-of-sale (POS) activities.

2. Discussion of the Related Art

Retail stores have found that customer returns have been associated with fraud. For example, unscrupulous employees process customer return receipts through the point of sale (POS) computer system without the customer actually being present, issuing fraudulent refunds that can be pocketed by the employee. Retail establishments have attempted to combat this with increased supervision, as well as monitoring of video cameras located near the return aisle. However, it is impractical to have a human supervisor continually monitor either a live camera feed, recordings made by the camera, or the return aisle itself.

Intelligent video monitoring has become known in recent years. This type of monitoring allows certain suspicious activities to be detected by analyzing video information stored on a computer video surveillance system. However, the sheer amount of video to be searched makes this a daunting task.

Prior video monitoring systems for detecting consumer return fraud intercepted the return receipt event and the video is analyzed in real time. However, this takes an extremely large amount of CPU time and limits the times at which the analysis can be done to relatively contemporaneously with the potentially fraudulent event.

SUMMARY OF THE INVENTION

In a video monitoring system video data is captured from sources, such as cameras, and the video data is analyzed to create metadata descriptive of the events and objects occurring in the video. In accordance with one aspect of the present invention, this metadata, which consists of data about the video, is then analyzed on a transaction basis to determine if a suspicious activity, such as a fraudulent Point of Sale (POS) return event, has occurred. One or more of plural metadata analysis techniques may be used by the system to analyze the metadata.

BRIEF DESCRIPTION OF THE DRAWINGS

For the purposes of illustrating the invention, there is shown in the drawings an illustrative form, it being understood however, that the invention is not limited to the precise form shown by the drawings in which.

DETAILED DESCRIPTION OF THE EMBODIMENTS

A video monitoring system utilizable with one aspect of the present invention generates metadata relating to occurrences or objects in a video stream from one or more cameras by use of a software or firmware functional element that will hereafter be referred to as an object engine.

The object engine analyzes the video stream generated by one or more surveillance cameras and, using known video analysis techniques, generates metadata descriptive of the activities from the video. The video metadata thus generated includes data, for example, as to position, size, and movements of an object or objects in the video. Metadata relating to other aspects of the video and/or audio data also (or alternatively) may be used.

An exemplary use for the video monitoring system described herein is to analyze point of sale (POS) transactions for events that may represent fraudulent activity. At some point in time after the object engine has generated metadata, return receipt data from a POS terminal can be analyzed and, based on the time windows defined by those receipts, the metadata associated with the time window, as opposed to the raw video data, can be analyzed by the system for suspicious circumstances. Examples of circumstances that would be considered suspicious are the absence of any customer appearing in the region of interest, for example a customer region of interest, during a time period corresponding to the return/refund transaction.

Figure 1:
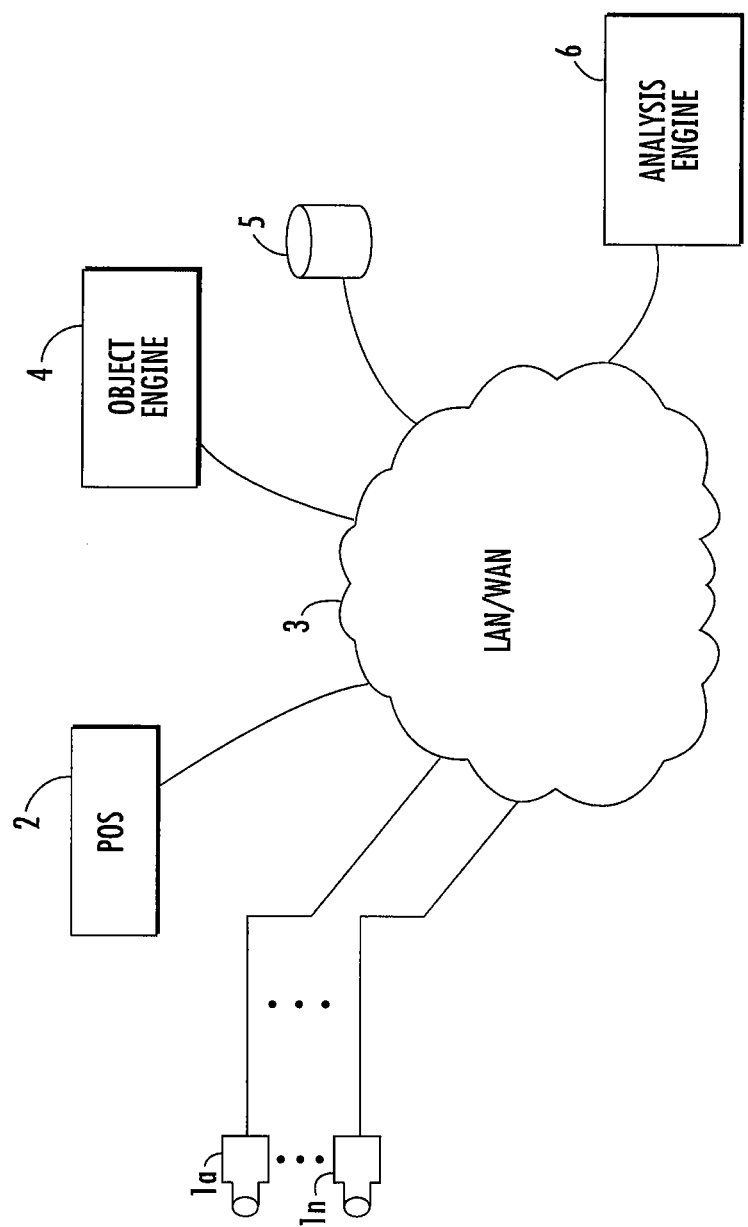
FIG. 1 is a diagram illustrating the main components of a fraud detection system that incorporates an aspect of the present invention.

FIG. 1 is a high level description of the functional elements of an exemplary embodiment of the system. As can be seen in the figure, a video analysis system in which the present invention could be utilized includes video cameras 1a through 1n, for capture of video data at locations of interest, such as, for example, cash registers, return lanes associated with the cash registers, and points of entry and exit. The video data retrieved by the cameras can, for example, be stored in a dedicated storage facility, or in a shared database, such as illustrated by data storage system 5. Data storage system 5 may be accessible by various system components over a Local Area or Wide Area network 3, or may be a distributed system of storage elements accessible locally as needed. The depiction of the LAN/WAN is not intended to be limiting as the various connections between the functions can be implemented in any way compatible with the goals of the system, as would be understood by those in the art and would not be limited to particular types of networks or connections.

The cameras may be associated with, for example, a Point of Sale (POS) computer system 2, which would preferably include computer, network and database facilities not shown in this high level diagram but of a type known to those skilled in the art. The POS system preferably has access to sales related information, such as receipts, including sales transaction times, receipt images, inventory, and other sales related information. The cameras may be associated with one or more recorders for storing and making available the recorded video.

The object engine 4 has access, either in real time, or at selected times, to the video information captured by the cameras 1. The object engine 4 analyzes the video stream generated by the surveillance camera(s) 1 and, using video analysis techniques, generates metadata descriptive of the activities from the video. This analysis would typically be done on stored data, but could be done in real time as well. The metadata generated by the object engine 4 includes data as to position, relative size, and movements of an object or objects in the video. The generation of object metadata can be performed using any of the techniques presently known to those skilled in the art, such as those described in U.S. Pat. No. 6,877,134, to Fuller et al., Issued Apr. 5, 2005, as well as any techniques developed in the future.

Unlike the video data itself, the metadata is data about the video data and is therefore considerably smaller in size. This is advantageous for several reasons. In the first place, it is much easier to search a smaller amount of data. Thus, if events and/or objects in the video need to be found, a relatively small amount of data, needs to be searched, even if a long period of surveillance is being examined. Second, the bandwidth necessary to transmit this information would be much less than with raw video data, even if such raw video data is compressed.

Once the metadata relating to the video has been stored, it is made accessible to an analysis engine 6. The analysis engine 6 is, for example, software running on a computer system that performs analysis on the metadata produced by the object engine 4. The analysis engine allows a user, or an automated process, to locate occurrences of interest in the stored object metadata, and in particular on a transaction basis.

For example, in detecting fraud in a customer return situation, an occurrence of interest would be that no customer appears in the field of view of the return cash register at the time of a return transaction. In particular, an analysis of objects appearing in the video, and as described in the metadata, could indicate that only the cashier was present at the time of a return transaction.

That is, the only object that is a candidate for a person in the field of view is in the area where the cashier is located. This situation may be indicative of a fraudulent transaction since returns are usually initiated by a customer returning an item for a refund or credit. If a cashier performs such a transaction without a customer being present, it may represent a dishonest employee trying to obtain a refund for him or herself.

The system allows for padding of time prior to and post transaction, i.e., a time window, for detection of a customer. The provision of the time window allows for customers coining into the field of view, but not standing in the customer region during the actual transaction.

Various techniques are employed by the analysis engine in interpreting the metadata. These techniques, as would be understood by one of skill in the art, can, for example, be implemented by software programming of the analysis engine, which can comprise, for example, a general purpose computer having, CPU, memory, I/O and other known components. Such a computer can be programmed to perform any of the techniques described herein.

Figure 2:
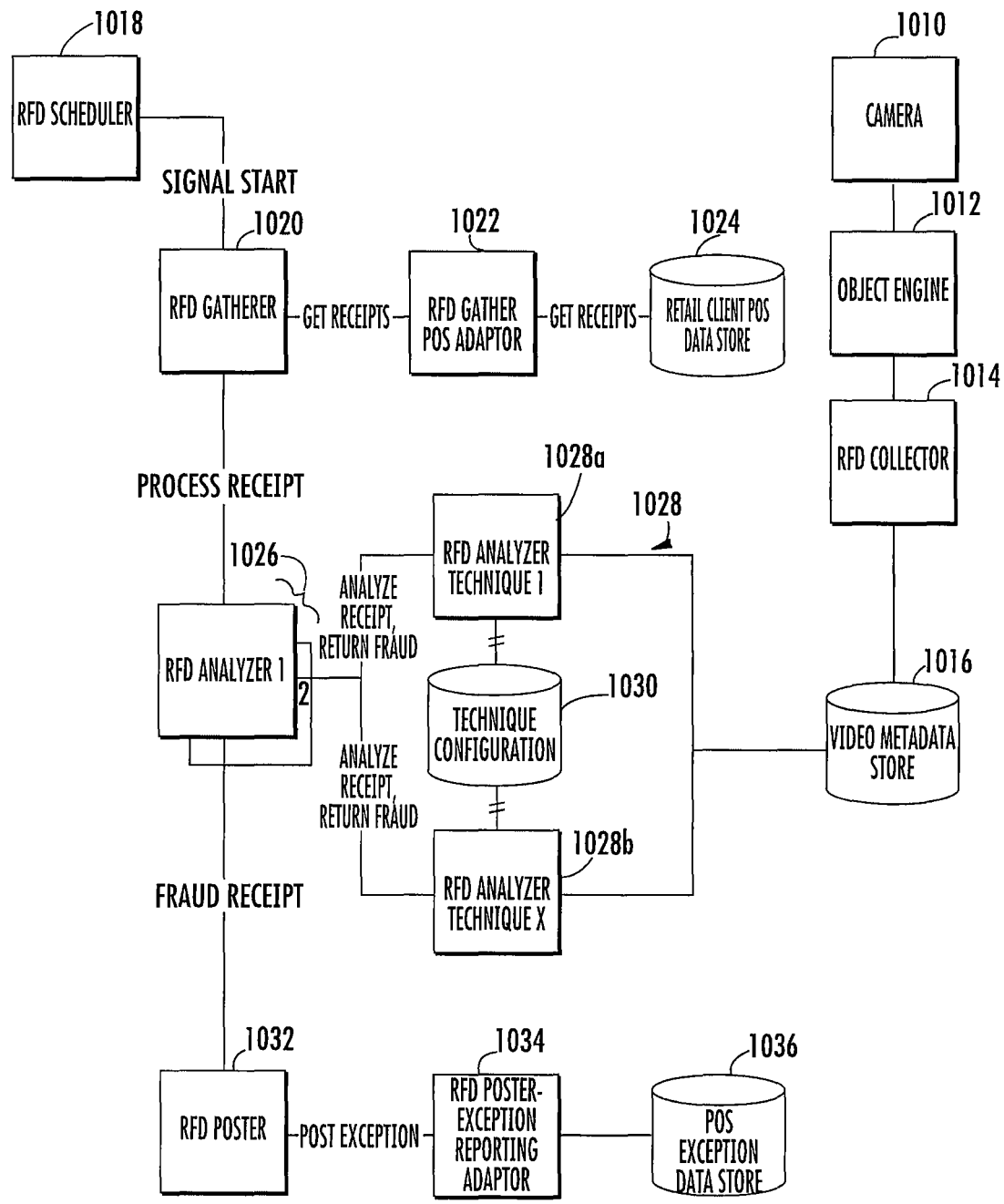
FIG. 2 is a diagram illustrating the functional components of the fraud detection system in accordance with one aspect of the present invention.

One way of implementing return fraud detection (RFD) is to use a system such as the one illustrated in FIG. 2.

The case of a cashier performing a return without a customer present has been determined to be a high probability case of fraud. The system detects this fraudulent activity by comparing the return receipts generated by the cashier against contemporaneous activity within specified regions of the video. The system shown in FIG. 2 is adaptable to different camera views and different POS systems by providing a framework for ease of integration. FIG. 2 illustrates the functional elements of the system, each of which can be implemented as a software application running on a computer system. The applications may be distributed among a plurality of distributed computer resources, and one or more application may operate on a particular computer.

Distribution of the application preferably relates to the location of the computer system to which the functions are related. Thus, for example, it would be preferable for the object engine application to be located in a computer related to a recording system associated with a POS location. This would permit the metadata relating to the video obtained by the cameras to be generated locally, taking advantage of the reduction in bandwidth engendered by the use of metadata. In this way, only the metadata need be transferred to the location at which the analysis functions are performed. However, the invention is not limited to this implementation.

Further, the system is particularly useful for use by a POS backend computer system. For this reason, it may be advantageous to have one or more of the elements of the system, or all of the elements of the system, located in a computer system local to the POS. Alternatively, the elements relating to the gathering and analysis of metadata can advantageously be located at a location remote from the POS, allowing the system to provide analysis for a number of POS locations and requiring a minimal amount of hardware and software to be actually installed at the POS.

This implementation of the system is shown in FIG. 2, which can provide ease of integration into different retail environments with respect to camera angles and various POS systems. This implementation of the system is particularly useful for scanning, receipts after hours or on a schedule defined by the retail client. The system in this illustrated implementation initiates the process of scanning for return fraud by means of a scheduling function.

Referring to FIG. 2, on a specified schedule, managed by a scheduler 1018, or alternatively on demand, an RFD gatherer 1020 begins collecting receipts. The gatherer 1020 performs this process by invoking a get receipts function utilizing a POS adaptor 1022. The POS adaptor 1022 software component obtains receipts from retail client POS data store 1024. The POS data store 1024 stores receipts for any transaction involving a receipt, and in particular, where return fraud detection is involved, any return receipts. An advantage to this design is that it allows integration to a POS system without additional hardware to intercept the POS data on the network. The system can query a POS database rather than maintain a separate database. Additionally, this design allows the system to perform all processing during low POS traffic hours.

The RFD gatherer 1020 preferably collects all receipts since the last execution of, e.g., return fraud detection (RFD) processing to the current time. The RFD gatherer 1020 persists the collected receipt data to the local system so that a power failure will not cause data loss. The RFD gatherer 1020 then sends a request to an RFD analyzer 1026 for each receipt gathered from the retail client POS system. The RFD gatherer 1020 is responsible to send the receipt to the appropriate RFD analyzer 1026. Multiple instances of the RFD analyzer 1026 may run on multiple servers to maximize processing efficiency. Because the video metadata includes time tags, an association can easily be made between any transaction recorded in the POS database, such as a return transaction, and a time window in the video data. The time window, for example, would be a period of time starting before the return, or other POS, event and ending some time after the return, or other POS, event.

As mentioned above, the RFD gatherer 1020 uses the concept of an adaptor to collect the receipts. The adaptor, such as the POS adaptor 1022, is a specific software component that is written for each retail client. With each POS system being vastly different, the ability to specialize adaptor design for a particular retail client allows for ease of integration to each POS system. This reduces the time to market from requirements to certification by eliminating several hours of development and QA. Only the adaptor has to be tested for each client; the remainder of the system can be standardized.

The adaptor is a standalone executable that is initiated by the RFD gatherer 1020 and returns the receipt information, obtained from the POS data store 1024, to the RFD gatherer 1020. Another advantage to this design is that it allows either the vendor of the system or the customer at the POS to write the adaptor. This has an advantage in that a customer may not want to allow a vendor to have direct access to their database. An additional advantage is that the vendor can sell the system as a software development kit (SDK) without additional work from the vendor for RFD gatherer 1020.

The RFD analyzer 1026 takes each receipt and initiates analytics to determine if the receipt is a potential fraudulent case. The RFD analyzer 1026 initiates a technique adaptor using the same architecture as the RFD gatherer for each receipt. The RFD analyzer adaptor 1028, which preferably include analyzer adaptors, e.g., 1028a and 1028b, utilizing different analysis techniques, determines if fraud is present by comparing the metadata from the video stream associated with a transaction against one or more defined techniques, which will be discussed in greater detail below. If the RFD analyzer adaptor 1028 detects possible fraud in the metadata from the video in a time window corresponding to the return receipt, it signals the RFD analyzer 1026 that the specific receipt may be fraudulent. If the result of the analysis is positive, the RFD analyzer 1026 signals the RFD poster 1032 of the fraud.

The advantage of using adaptors for the analyzer is that new techniques may be created without affecting the rest of the RFD framework. A new technique can always be added, for example to provide a higher confidence level. This is a huge advantage if the vendor must create new analysis based on any condition that affects the accuracy of RFD (e.g. camera angle, lighting, return lane structure, etc).

As shown in FIG. 2, at the point of sale, video surveillance camera or cameras 1010 monitor the area at which receipts are generated. The object engine 1012 analyzes the video information, and, using known object extraction techniques, extracts video metadata, that is, data about the video data. As discussed above, the use of metadata significantly reduces the amount of data that must be stored, transmitted and analyzed. The RFD collector 1014 manages the metadata, which is stored in the video metadata store 1016. The RFD analyzer 1026 applies the analysis techniques to metadata obtained from the video metadata store 1016. Because the video metadata is time stamped, it is possible to isolate time windows in the Video metadata relating to a particular transaction associated with a particular receipt.

Once the analysis has been completed, the RFD poster 1032 collects all fraud alerts from the RFD analyzer 1026. The alerts are persisted to prevent a power failure from causing data loss. Preferably on a scheduled basis, the RFD poster 1032 sends all collected alerts to a system for reporting the alerts. The RFD poster 1032 preferably uses the same adaptor technology, in particular exception reporting adaptor 1034, to allow easy integration into a retail customer's environment, and forwards exception data to a POS exception data store 1036.

Figure 3:
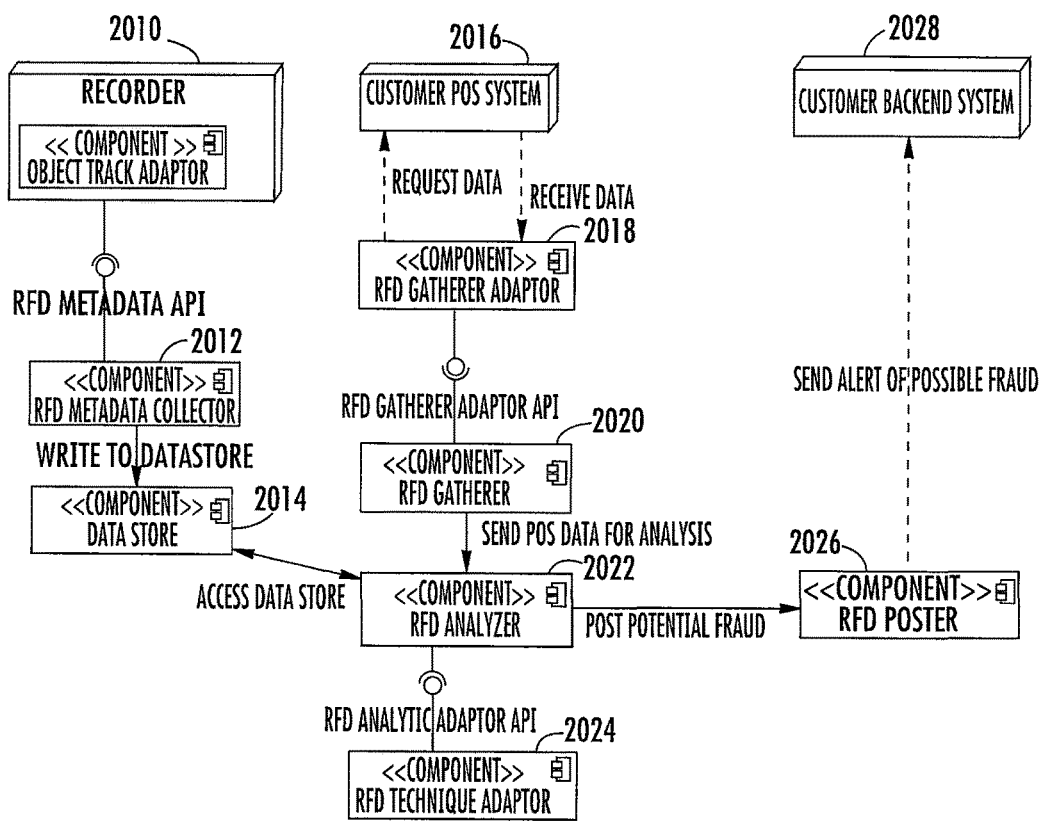
FIG. 3 is a diagram illustrating an exemplary embodiment showing the interaction between the functional elements in analyzing video metadata, in accordance with one aspect of the present invention.

FIG. 3 is a diagram illustrating the interaction of system functional components with one another. A recorder 2010 includes a camera, not shown, and an object engine software component (object track adaptor) for creating metadata for the recorded video relating to objects of interest in the video. This metadata is interfaced to a metadata collector 2012 using an RED metadata API. Among the functions of the metadata collector 2012 is to manage collection of the metadata and writing of the metadata to a data store 2014. The RFD metadata collector 2012 records data, sent from the object track adaptor, pertaining to an object found in a camera's field of view. This data preferably includes an object id, timestamp, location coordinates, object length and width (as a percentage of the video), video resolution and camera id. The RFD metadata collector 2012 persists the data to the local system so that a power failure will not cause data loss.

The object track adaptor in the Recorder 2010 loads a configurable object engine and sends object data generated by the object engine to the RFD metadata collector 2012. The object track adaptor is adapted to integrate different object engines into the fraud detection system. This component can exist on the server or an edge device.

A customer POS system 2016 is a computer system of the POS customer. Such a system, among other things, manages data relating to receipt transactions from POS terminals. The data from the terminals is date and time stamped such that the exact time of a transaction is specified along with receipt data from the POS system 2016. In order to handle requests to and from the POS system 2016, an RFD gatherer adaptor 2018 is employed. The RFD gatherer adaptor 2018 is a software module used by the RFD gatherer 2020 to interface with the POS system 2016 and to pass along the receipt data to the RFD gatherer 2020. The RFD adaptor 2018 submits a request to the POS system and receives the requested data. The RFD adaptor 2018 invokes a RFD gatherer adaptor API for interfacing and passing data to and from the RFD gatherer 2020.

POS data retrieved by the RFD gatherer 2020 is sent to the RFD analyzer 2022 for analysis. The RFD analyzer 2022, based on the time stamp of the receipt for which analysis is being performed, retrieves from the Data Store 2014 the video metadata for a time window that includes the time of transaction. Such time window will preferably include a period of time before and after the time stamp, the time period being settable in accordance with experience in the types of transactions being dealt with.

The data that is collected by the RED metadata collector 2012 is used by the RFD analyzer 2022 when reviewing video for potential fraud.

The RFD analyzer 2022 applies the analysis techniques discussed above, and as discussed further below, determines if the object metadata during the time window of the return receipt is consistent with, or indicative of, a fraudulent return, or other fraudulent event. The RFD analyzer 2022 utilizes the analysis techniques from the RFD Technique Adaptor 2024 by invoking them using the RFD analytic Adaptor API. If the analysis results in a positive indication of possible fraud for the receipt being analyzed, the fraud is posted to the RFD poster 2026, which sends an alert of possible fraud to the Customer Backend System 2028.

Typically, the retail establishment, or other entity, armed with the indication of potentially fraudulent transactions, will then review the actual surveillance video to see if the transaction is actually fraudulent. However, because the determination has been made as to which transactions are of interest, the amount of video that would have to be reviewed is limited only to the brief time windows associated with the identified potentially fraudulent transactions, saving time for the security personnel at the retail establishment.

Two exemplary techniques utilized by the RFD analyzer will now be discussed: inclusion and mutual exclusion. With the inclusion technique, a customer region of interest (ROI) is defined on the camera field of view. A pre-time and post-time check are defined as the number of seconds prior to the receipt and the number of seconds after the receipt that the technique will look for a customer. If, by analysis of the video metadata for this time period, a customer is not detected in the region of interest, the receipt is flagged as potential fraud. The technique inclusion is particularly useful, for example, in a situation where a very clean overhead view is available of the return desk and the area where the customer would stand.

Figure 4:
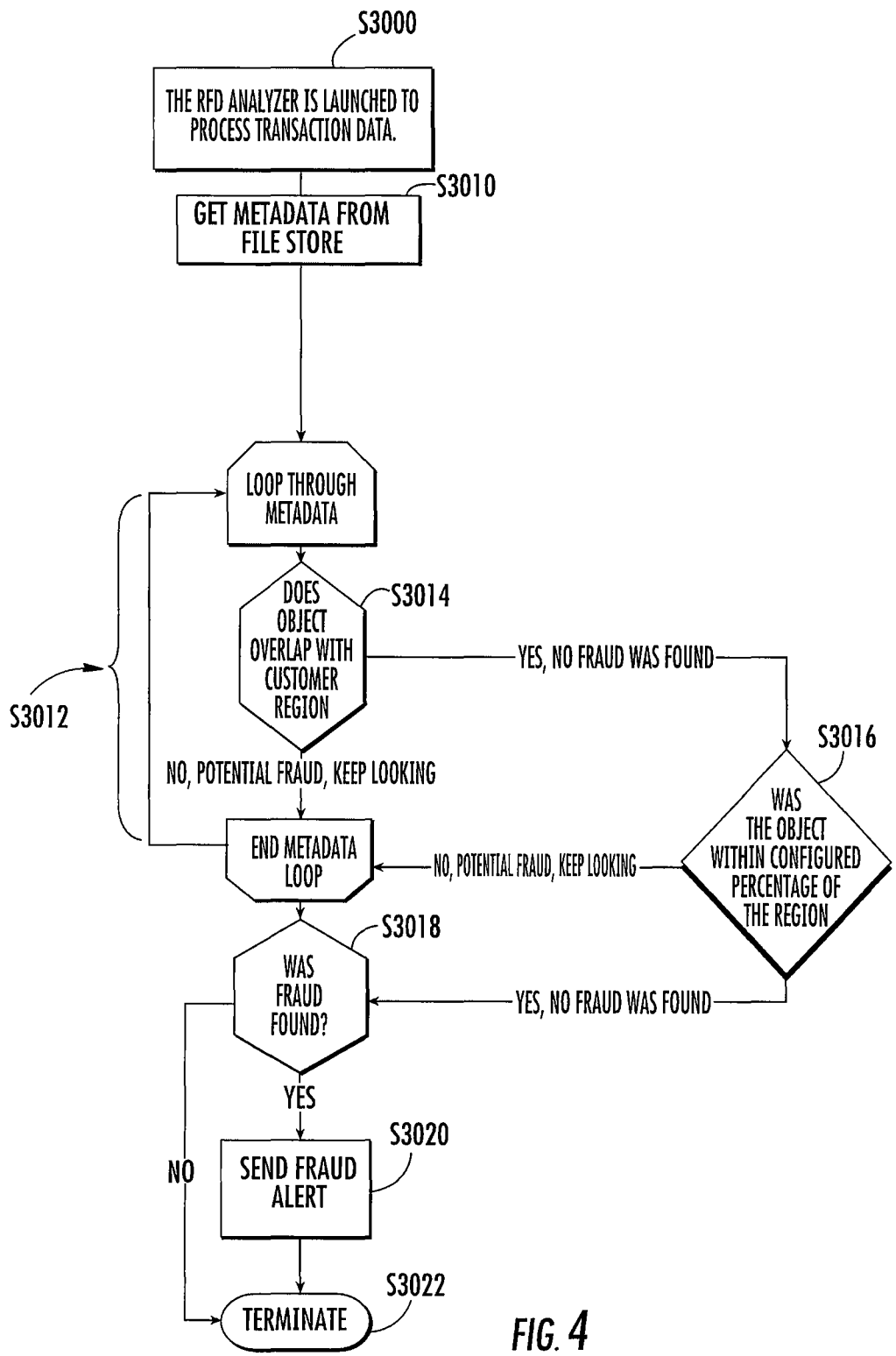
FIG. 4 is a flow diagram of the inclusion technique of object metadata analysis in accordance with one aspect of the present invention.
Figure 4A:
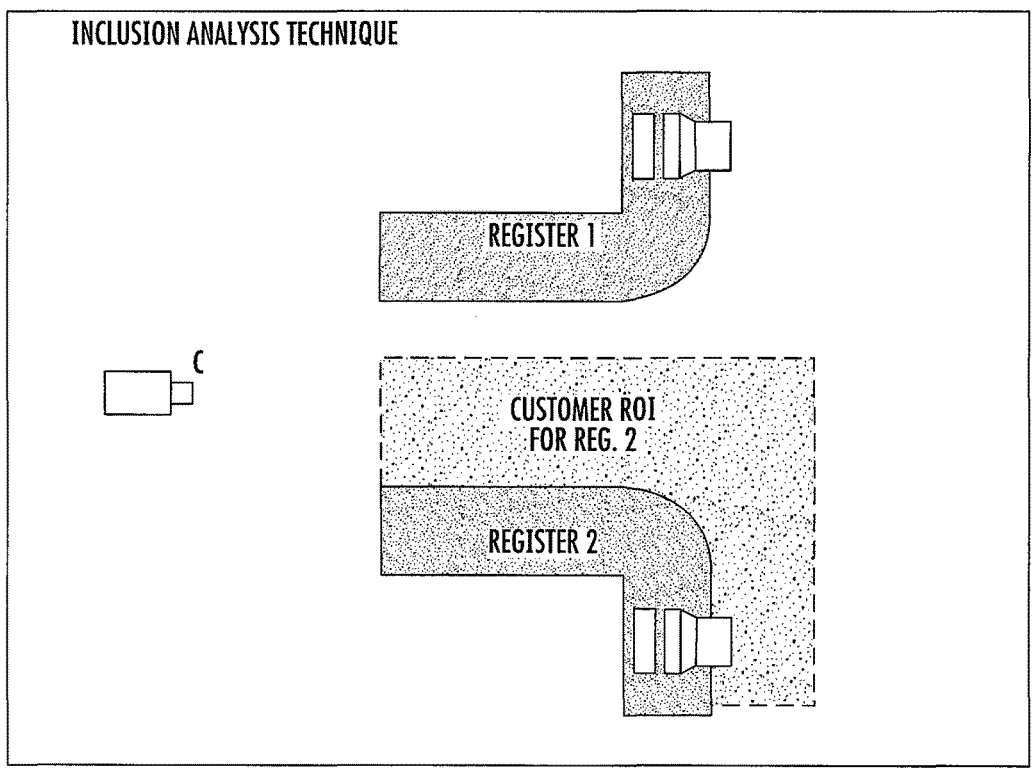
FIG. 4A is a drawing illustrating a relationship between a customer region of interest and a register.

An inclusion determination process is used by the analysis engine to determine, based on the metadata, that a customer is within a region, for example a region around a cash register, during a return transaction and for at least a configurable minimum amount of time. FIG. 4 is a flow diagram illustrating the inclusion technique. FIG. 4A illustrates the relationship between the customer region of interest (ROI) and the register, according to an exemplary embodiment.

At step S3000, the RFD analyzer is launched to process the data relating to a particular transaction. At step 3010, metadata corresponding to a time window associated with the transaction is retrieved from the metadata file store, in the manner discussed above in connection with the other figures.

A loop S3012 is next begun. This loop performs an analysis on objects identified in the region of interest for the time window of the transaction to be checked. During the loop, objects that have been identified within the metadata are checked to see if they overlap with a region of interest (ROI), for example, in the return fraud detection situation, a customer region of the POS location, that is, a region in which a customer is expected to be located. The position and other metadata of the candidate object is compared with the ROI to determine existence of overlap. ROI data is data obtained through a region of interest file. Detection of overlap can be done, for example, by use of known collision detection techniques. However, the present invention is not limited to the use of such detections and other overlap detection techniques, now known or developed in the future can be used for this purpose.

During the loop, for each candidate object in the time window, a determination is made at step S3014 whether any overlap exists between the candidate object and the ROI. If no overlap exists between the object and the ROI, this is an indication of potential fraud and the loop continues to examine further candidate objects in the time window. If some overlap exists between the object and the ROI for at least the minimum configurable time, then a preliminary determination at Step S3014 is made that there is no fraud relating to that object. However, an additional check is made, at Step S3016, to determine if the candidate object is within a configured percentage of the region. This test is somewhat more stringent and may fail even if the first test passes. If it fails, that is, returns a "No," it is an indication of possible fraud and the loop continues to examine more candidate objects during the time window. If, on the other hand, the object being checked at Step 3016 is found to be within the configured percentage of the customer region, it is determined that the transaction was not fraudulent and the loop is exited.

If the loop has examined all of the candidate objects in the time window and exits the loop, and none of the objects are determined to be within the percentage of the customer region, then, upon exiting the loop, a determination is made, at Step S3018, that potential fraud has been found and a fraud alert is sent at Step S3020 and the program terminates at step S3022. If no fraud has been found, then the flow continues to termination without sending an alert.

Depending on the camera angle, it is possible that a customer is actually present, but that he or she is obstructed by the cashier. To account for this, the present invention includes a mutual exclusion technique.

The mutual exclusion technique is particularly good for a camera angle when another person may partially obscure or overlap the customer region of interest. This technique determines whether the person (object) identified is really the customer and not the cashier or a person in a different line.

The mutual exclusion (ME) technique first determines if a customer is not present in the customer region of interest. If a customer is detected in the customer region of interest, the ME technique will determine if the same object is also in the cashier ROI. If the object is more in the cashier ROI than the customer ROI, the object will be considered a cashier instead of a customer. A person (object) is determined to be in a region of interest by detection of overlap between the object and the region of interest. Percentage in a region is determined by surface area intersection of the overlap.

Figure 5:
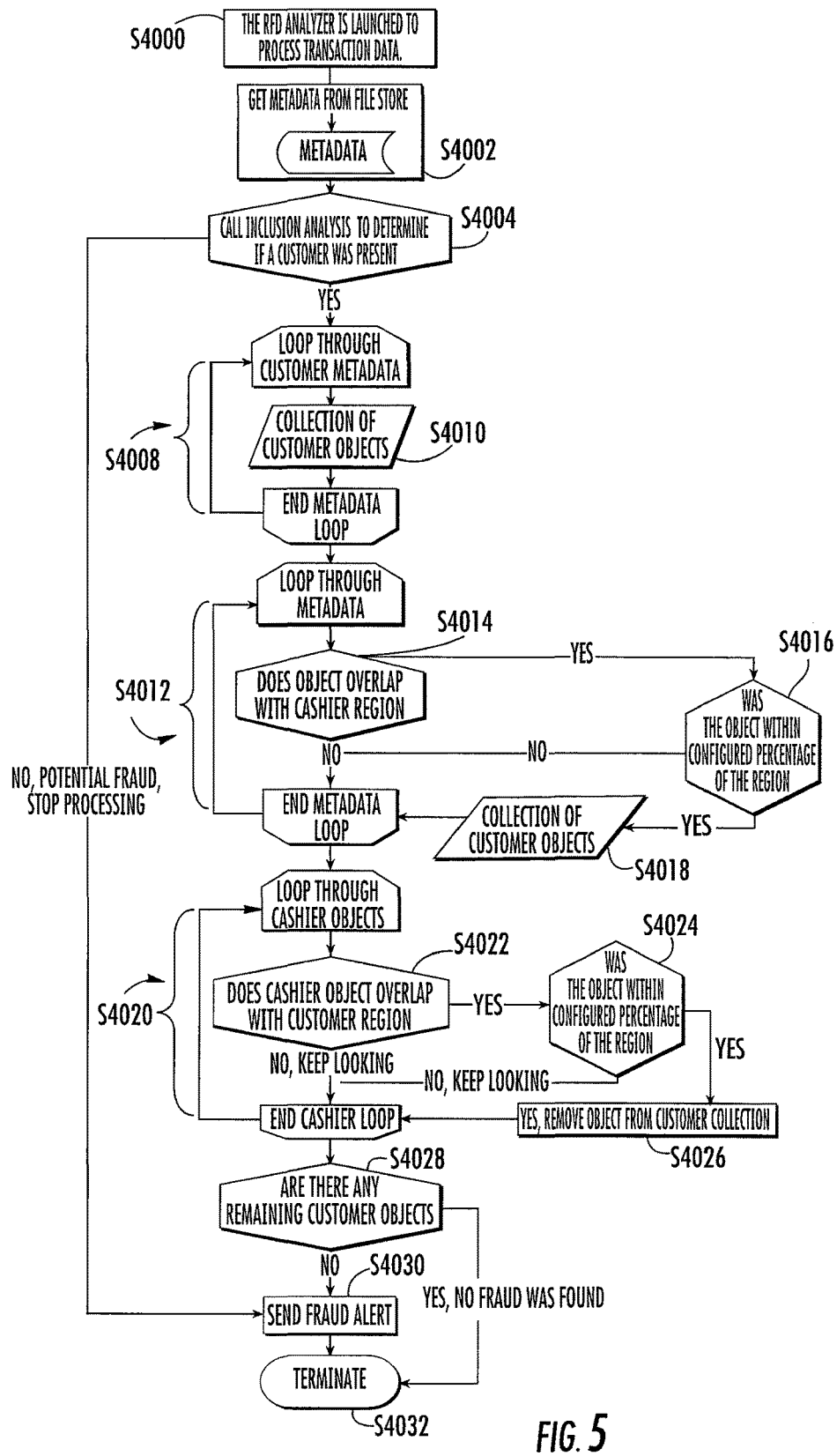
FIG. 5 is a flow diagram of the mutual exclusion technique of object metadata, analysis in accordance with an aspect of the present invention.
Figure 5A:
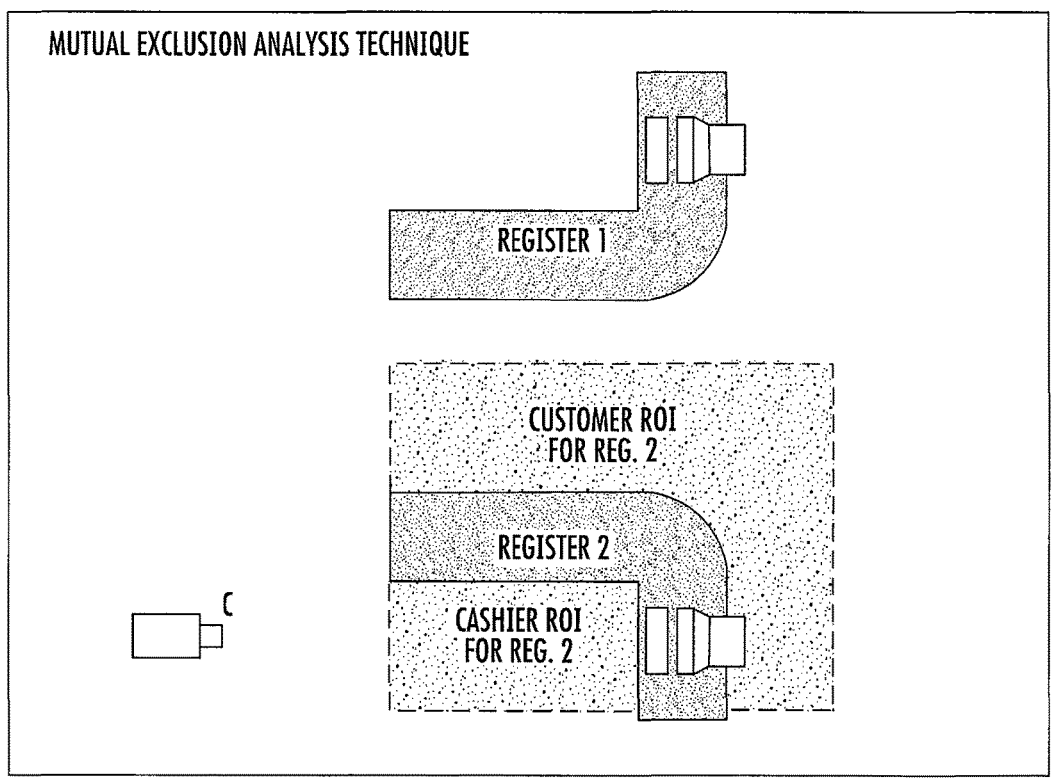
FIG. 5A is a drawing illustrating a relationship between a customer region of interest, a cashier region of interest, and a register.

FIG. 5 is a flow diagram illustrating the mutual exclusion technique. FIG. 5A illustrates the relationship between the customer region of interest (ROI), the cashier region of interest (ROI), and the register, according to an exemplary embodiment. At step S4000, the RFD analyzer is launched for processing transaction data. Metadata is then retrieved, at step S4002, from the metadata store. At step S4004, it is determined if the inclusion technique has already determined that no object is in the customer region of interest. If this has been determined, the flow proceeds to step S4030 and the fraud alert is sent and the RFD analyzer program terminates.

If the inclusion technique has detected an object in the customer region of interest, the mutual exclusion technique analysis is performed on the customer metadata to perform a further check. As discussed above, the mutual exclusion technique will check to see if the object determined to be in the customer region of interest is also in the cashier region of interest. At step S4008 a first loop is performed to collect the customer objects located within the customer region of interest within the time window of the transaction.

Next, at step S4012, a second loop is executed. During execution of this second loop, it is determined if a candidate customer object, i.e., an object that has been determined to be at least partly in the customer region, also overlaps with the cashier region. In this manner, a collection of potential cashier objects is gathered for further processing. At step S4014 within the second loop, for each object, it is determined whether the object overlaps with the cashier region. If no, the loop continues to examine a next candidate object. If yes, then a determination is made at step S4016 whether the object is within a configured percentage of the cashier region. If no, then the loop continues to examine the next object. If yes, then the object is added to a collection of cashier objects, at step S4018.

In step S4020, a third loop, through the collected cashier objects, is performed. During this third loop, each cashier object from the time window corresponding to the transaction is checked to determine if it overlaps with the customer region. Any object that has been determined to be in the cashier region, and which is also now also determined to be in the customer region, is a candidate for fraud. During the loop, a candidate is checked, at step S4022, to determine if the candidate cashier object overlaps with the customer region. If not, the loop continues to test further candidate cashier objects within the transaction time window.

If the result of the determination is yes, then a further determination is made, at step S4024, whether the object is within a configured percentage of the customer region. If yes, then the object will not be considered to actually be a customer object, and, at step S4026, the object will be removed from the customer object collection, and the loop continues to test the next cashier object. If the result of the determination at step S4024 is no, then the loop continues to test the next cashier object within the collection of cashier objects.

When the looping has tested all of the cashier objects, the flow drops out of the loop and a determination is made, at step S4028, whether there are any customer objects remaining in the customer objects collection. If at least one customer object remains, then no fraud has been detected and the program terminates at step S4032. Otherwise, the flow proceeds to step S4030 and a fraud alert is sent.

Detection of overlap in the mutual exclusion technique can be done, for example, by use of known collision detection techniques. However, the present invention is not limited to the use of such detections and other overlap detection techniques, now known or developed in the future can be used for this purpose.

The analyzer of the system described above is capable of utilizing one or more of multiple analysis techniques to give a greater amount of confidence in the determination of an event of interest. The use of the technique adaptor, as described above, allows the system to be flexible and for additional or different techniques which may be developed to be added or substituted as developed. This makes the system very easy to maintain and improve as time goes on, without the necessity of retesting the entire system.

Moreover, the system is capable of using different techniques, such as those discussed above or later developed, on different cameras at the same time. It is noted that the metadata for each camera will be at the disposal of the analysis engine. The analysis engine is capable of, for example, using the mutual exclusion technique on the metadata from one camera, and the inclusion technique on the metadata from another camera. Another example would be to use one camera at two return lanes. For one lane, which would be associated with one region of interest in the field of view, one technique can be used, and for the other lane a different technique can be used. Alternately, multiple techniques can be used for the same lane and a vote made between the results to obtain a higher degree of confidence.

In addition, multiple ones of the techniques can be used on the data from the same camera to produce a higher confidence level for the result. The same result from different techniques would be a strong indicator of a good result.

Figure 6:
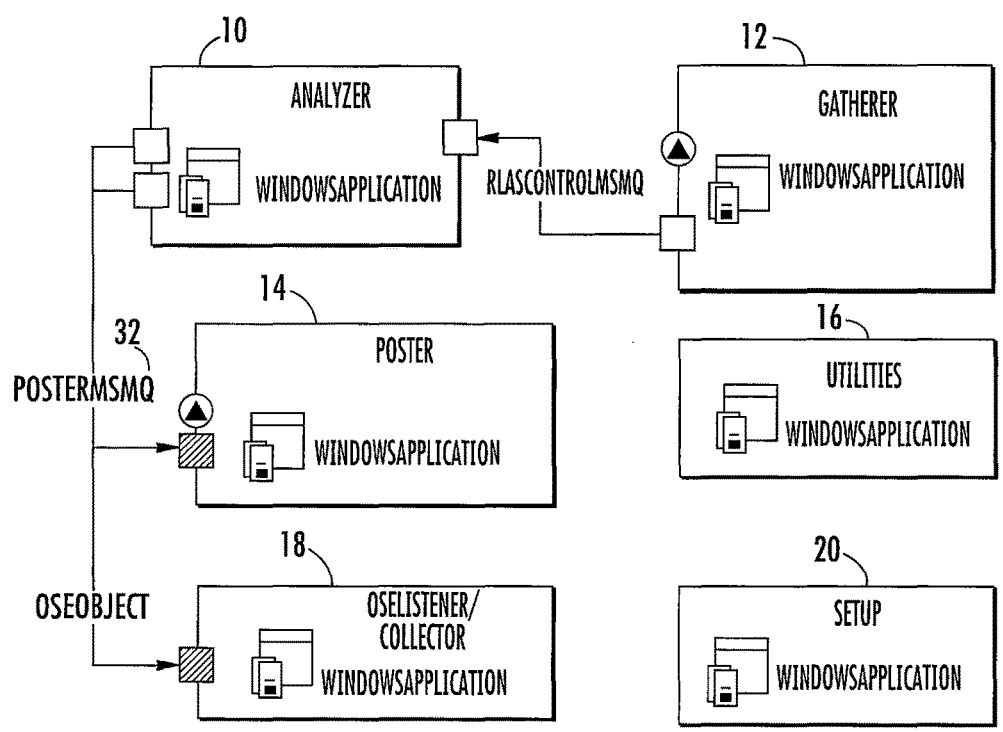
FIG. 6 is an application diagram illustrating an embodiment in which the functional elements of the system are implemented as Windows applications.

FIG. 6 is an application diagram for an exemplary implementation in which the functional elements of the system are Microsoft Windows applications. FIG. 6 illustrates the interaction between and among the following Windows applications.

OSE Listener 18

This service, also referred to as a "collector" in the description above, manages object engine (OSE) data, i.e., metadata extracted by the OSE. The listener/collector 18 collects OSE data from a Recorder associated with video input from, e.g., cameras located at the POS. The listener/collector 18 tells the Recorder which cameras to create data for, and it also returns data for a given time period, which is used during analysis, as discussed above.

Analyzer 10

The analyzer 10 is an application that analyzes a given transaction for fraud. It contacts the OSE listener 18 to obtain data for a given time, and then analyzes that data based a stored Region of Interest (ROI). The analyzer also updates its ROI when given new information.

Gatherer 12

The gatherer 12 is an executable program on the system that runs at a scheduled time, and gathers POS transactions from, for example, the retail establishment being monitored. It will then call a common library (all the supporting code that supports the various components discussed herein) to post these transactions to the appropriate queue. The gatherer 12 also determines which computer the appropriate analyzer resides on in a system having analyzers spread out over multiple computers.

Poster 14

The poster 14 takes data that is deemed fraudulent and posts it to the retail establishment.

Utilities 16

The utilities application 16 is designed to empty out the local OSE data. It is a standalone application that will run periodically.

Setup 20

The setup application 20 creates the Windows scheduled tasks, and creates the MSMQs that are required for use. This Microsoft application would preferably be installed on the operating system. This application will run during the install, but can also be run afterward to recreate the tasks and queues.

As shown in FIG. 6, The analyzer application 10 receives control MSMQ from the Gatherer 12. The analyzer 10 outputs a PosterMSMQ and an OSEObject to the Poster 14 and OSE listener 18 respectively.

Figure 7:
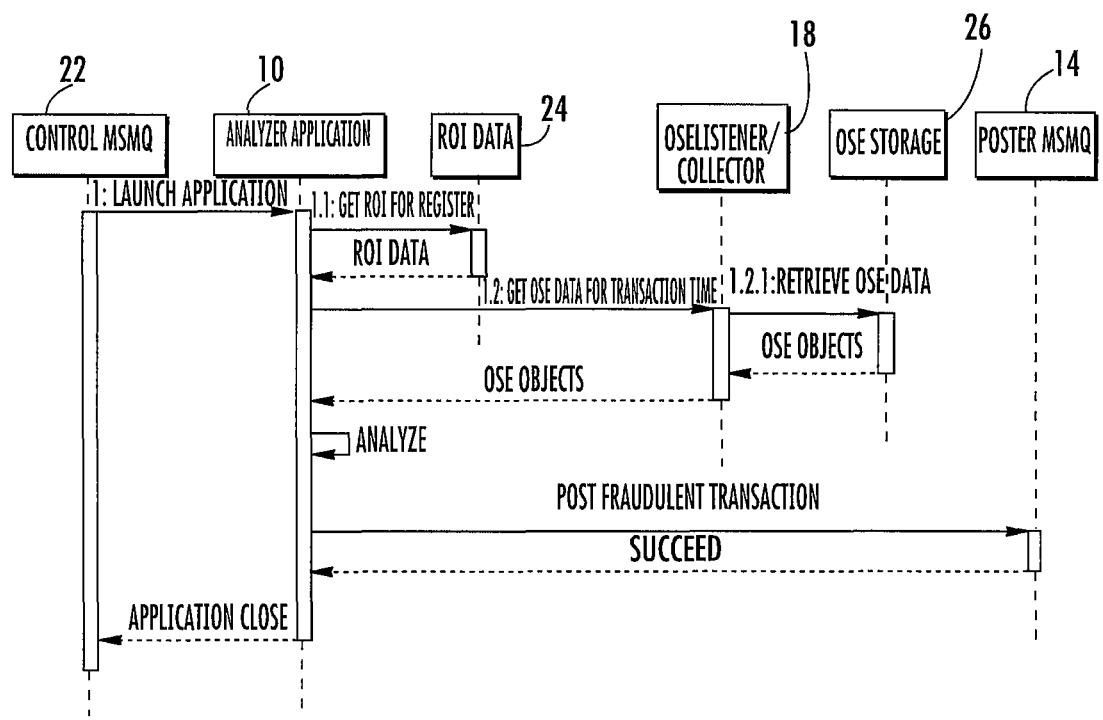
FIG. 7 is a diagram illustrating how the applications interact with one another to perform an analysis of video metadata in a case in which fraud has been detected.

The interaction between the applications for a transaction analysis, i.e., an execution of the analysis engine, for a particular transaction, is illustrated in FIG. 7. As shown in the figure, ControlMSMQ 22 controls the system to begin operation, instructing the analyzer application 10 to launch. The analyzer application 10 obtains region of interest data for a POS register from in ROI data application 24, which stores data relating to a region of interest (ROI) for a particular cash register.

Once the ROI data has been obtained, the analyzer application 10 requests the OSE listener 18 to return OSE (i.e., video metadata relating to objects) for the particular transaction time window. In response to this request from the analyzer application 10, the OSE listener 18 retrieves the appropriate OSE data from the OSE storage 26. Once the OSE objects have been retrieved, they are sent to the analyzer application 10, which performs the analysis algorithms discussed above to determine if the data contains indication of fraudulent activity. If the analyzer determines the presence of fraudulent activity, a fraud alert is posted to the poster MSMQ 14. After which the analyzer application closes.

Figure 8:
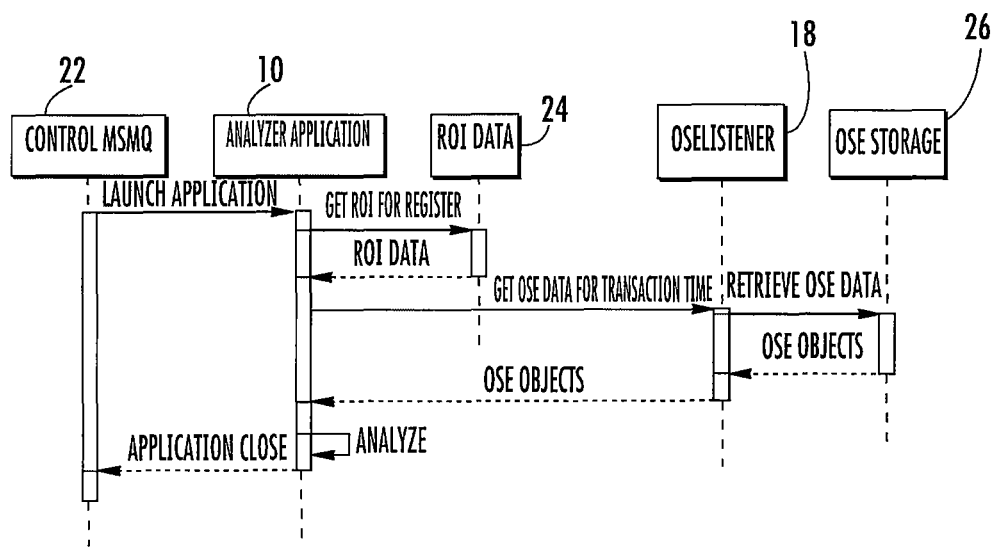
FIG. 8 is a diagram illustrating how the applications interact with one another to perform an analysis of video metadata in a case in which fraud has not been detected.

FIG. 8 illustrates the interaction between the same components as in FIG. 7 for the case in which no fraud is detected. As can be seen from the figure, the steps are identical except that no report is sent to the PosterMSMQ.

Figure 9:
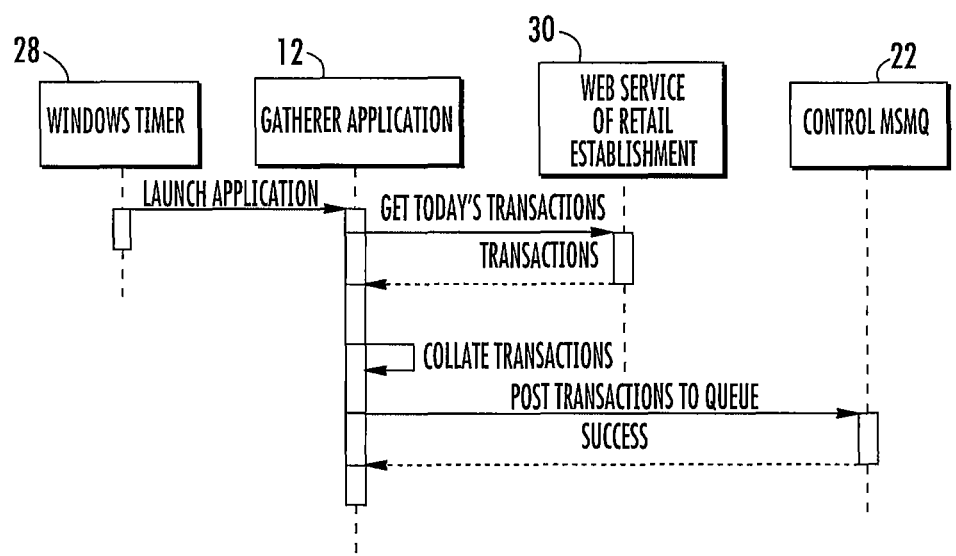
FIG. 9 is a diagram illustrating how the applications interact with one another to gather the point of sale transaction metadata from the retail establishment.

FIG. 9 illustrates the interaction between the applications during an execution of the gatherer application 12. As has been discussed previously, the gatherer 12 obtains POS data from, e.g., a retail establishment. The POS data obtained by the gatherer 12 is used by the analyzer 10, as discussed previously. In the implementation shown in FIG. 9, the retail establishment permits access to its transaction data via a Web server executing WebService application 30.

The POS transaction data is preferably launched periodically. The time at which the POS data is obtained can advantageously selected to correspond with down time for the POS backend computer systems, for example, at night or on weekends. In the Windows implementation discussed above, a Windows timer application 28 is used to set the timing for execution. As shown in the figure, the Windows timer 28 launches the gatherer application 12 and the gatherer 12 submits a request for transactions for a set period, in the illustrated example today's transactions, to the WebService application 30 of the retail establishment. In response, the WebService 30 returns the transactions to the gatherer 12, which collates the transactions. The Gatherer also posts the transaction to a queue at the Control MSMQ 22, which returns an indication of success.

Figure 10:
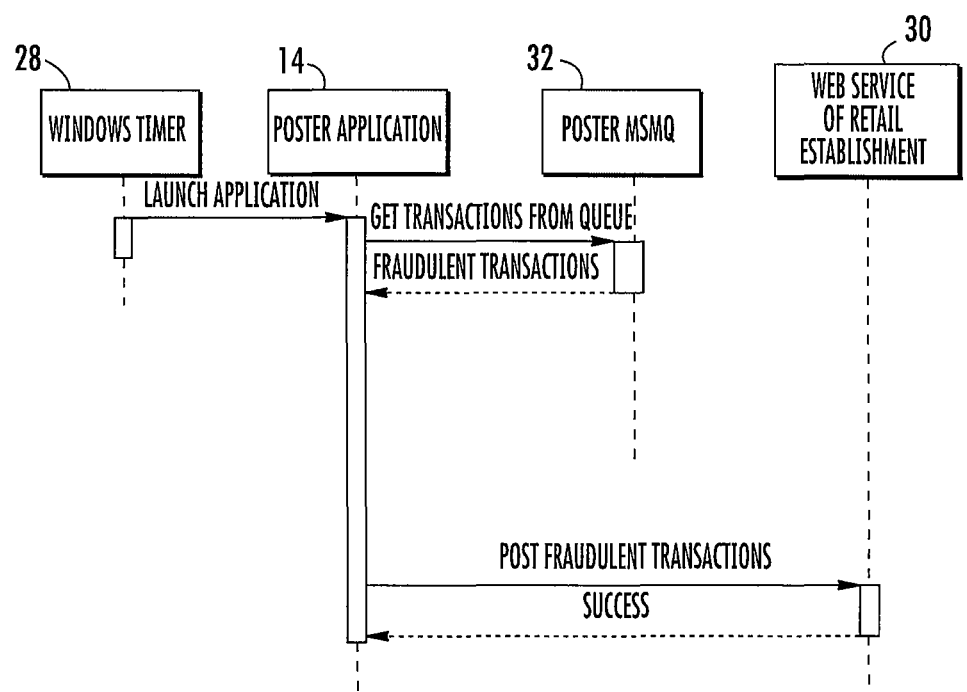
FIG. 10 is a diagram illustrating how the applications interact with one another to post fraudulent transactions to the retail establishment.

FIG. 10 illustrates the interaction between applications for the posting of a fraudulent activity detected by the fraud detection system. The Windows timer 28 launches the poster application 14. The poster application 14 obtains, from Poster MSMQ 32, transactions from a queue. Fraudulent transactions from the Poster MSMQ 32 are returned to the poster application 14. The poster application 14 then posts the fraudulent transactions to the WebService application 30 at the retail establishment, which returns a success indication to the poster application 14.

Figure 11:
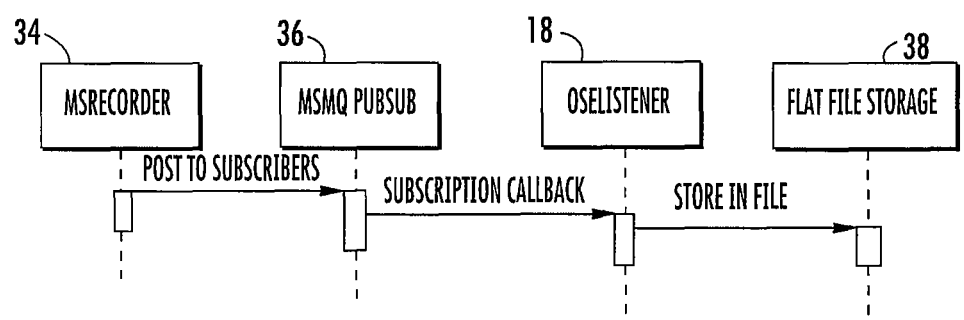
FIG. 11 illustrates the interaction between applications during collection of OSE data.

FIG. 11 illustrates the interaction between applications during collection of OSE data. OSE data, i.e., metadata from the OSE, is passed into the OSE listener 18 using the OSMDPubSub 36, which is support code to communicate with the OSE library from the recorder 34, an application that manages recorded video. The listener/collector 18 subscribes to the OSE for data. The OSE publishes the data to the listener 18. This data is serialized through XML as a transport mechanism.

To store the OSE data persistently, it is stored in flat file Storage 38, which contains the time and position of the object during its lifetime. The Poster MSMQ is a communication layer between the applications. OSE Storage stores the metadata. MS Recorder is an application that manages recorded video. It takes all video and moves it to the hard drive or other storage.

The system described above is operable for use in connection with scanning receipts after hours, or on a schedule defined by the retail client. The RFD scheduler initiates the process of scanning for return fraud. On the specified schedule, the RFD scheduler signals the RFD Gatherer to begin collecting receipts. An advantage to this design is that it allows integration to a POS system without additional hardware to intercept the POS data on the network. The system can query a POS database. Additionally, the system can perform all processing during low POS traffic hours.

The use of adaptors allows for case of integration into a POS environment as well as cross platform operation, since the adaptors could be written on a different computer from the other applications, or even on a Unix system. Moreover, the flexibility of using the adaptors provides for robust operation. For example, if the retail customer writes their own adaptor, even if the code is not very good (e.g. memory leaks), the main fraud detection system will recover since the adaptor is launched and terminated on each usage.

Moreover, the use of adaptors permits distributable architecture, with reduced delivery time to the retail customers, and allows the framework of the system to be pre-certified. Only the adaptors need to be created and plugged into the overall system, and a large percentage of the system is already created and tested even before individual adaptors are written. Adaptors also provide "plug and play" capability due to their portability. Moreover, this architecture allows for a customer to write his/her own adaptors, reducing the cost of the system as delivered. The system only requires that certain I/O and timing requirements be met.

In a retail return fraud application, the application, and in particular the gathering and analysis of POS data, may be run on a scheduled basis to allow customers to move data at off peak hours. A number of return receipt events can be correlated with metadata (that is, analyzed) at a particular point in time. So, for example, at 2 AM the system could obtain all receipts. This would correspond to off hours at the POS. The system would report exceptions detected by the analysis discussed above, and the retail establishment can later review the exception, e.g., by reviewing the actual corresponding video.

As discussed above, the system may be distributed so as to utilize multiple servers. This permits the system to distribute work among different processors to provide faster throughput or for analyzing cameras on different recorders. Moreover, the object engine can be built into the video encoder or located on the recorder, for example.

The architecture of the system described above prevents system failure due to memory overflow or invalid data input exceptions. It does this by allowing the system to be delivered to a client as a software development kit, allowing customer to write only code necessary to integrate into their environment. One advantage to this architecture is that the system may have to query a database, such as the POS receipts database, which is confidential to the customer. The system can allow the customer to write code, i.e., an adaptor application, for accessing the database and vendor of the detection need not access the database.

The present system manages multiple single task executables that manage the work flow for a single receipt. That is, the executables, e.g., the above-mentioned gatherer and analyzer, have their own purpose, allowing a single component to be changed without affecting the rest of the system. If a technique crashes it does not affect the rest of the system, and there is no need to certify the whole system for any change.

As discussed above, the system allows for padding of time prior to and post transaction for detection of a customer. This allows for customers coming into the field of view, but not standing in the customer region during the actual transaction. ROI data is data obtained through a region of interest file.

The video analysis system comprising the present invention can be implemented by any combination of hardware and software components, the components being distributed among one or more computers and/or computer systems. The system and the components thereof may be distributed in manners other than those discussed above, in accordance with distribution techniques now known or developed in the future, as will be appreciated by those skilled in the art. The present invention is not limited to the disclosed embodiments and is defined by the following claims.

Moreover, as would be appreciated by those skilled in the art, the correlation of events occurring at a POS and events substantially contemporaneously occurring in a region of interest is not limited to the detection of return lane fraud. For example, the present invention can be configured to detect and report the occurrence of a cash register being open when no customer, or no cashier, is present in a region of interest. Another situation detectable by the above-mentioned detection is detection to ensure that a second person, for example a manager in addition to a cashier, is present in a region of interest, such as the cashier's region of interest, in an cash register override situation. Another example is a "customer needs assistance" situation in which a customer is in the customer region of interest for more than a configurable period of time but not cashier is present.

The foregoing examples are illustrative only. The techniques described above can be used in various situations in addition to those discussed above, and in particular in situations in which POS data can be correlated with occurrences in regions of interest to, for example, ensure that procedures are being carried out.

What is claimed is:

1. A system for analyzing video metadata relating to one or more transactions at a point-of-sale (POS) device, the system comprising one or more processors and one or more storage devices cooperating to:
   receive a feed of video metadata containing information about a video stream corresponding to video events occurring at a customer POS region and video events occurring at a cashier POS region;
   select and execute one or more of a plurality of metadata analysis techniques on the video metadata to identify the presence or absence of a customer at the customer POS region during a time window corresponding to a return transaction;
   wherein the one or more selected and executed metadata analysis techniques include at least an inclusion technique that, for a particular transaction, returns an indication of no fraud if an object present in the video metadata, during the time window associated with the return transaction, is determined to overlap with the customer POS region by more than a predetermined percentage of the customer POS region.

2. A system according to claim 1, wherein the metadata includes information descriptive of objects and events in the video at the POS.

3. A system according to claim 2, wherein the metadata includes information relating to one or more of position, relative size, and movements of an object detected in the video.

4. A system according to claim 3, wherein a detection of the absence of a customer at the POS location associated with the customer is an indication of fraud, the system further comprising a poster application that posts a report of fraud to the POS location upon a detection of fraud.

5. A system according to claim 4, wherein the one or more selected and executed metadata analysis techniques further include a mutual exclusion technique that, for a particular transaction, returns an indication of fraud if an object present in the cashier POS region overlaps the customer POS region by more than a predetermined percentage.

6. A system according to claim 5, wherein objects associated with transactions from a first return lane are analyzed using the inclusion technique, and objects associated with transactions associated with a second return lane are analyzed using the mutual exclusion technique.

7. A system according to claim 5, wherein objects associated with transactions recorded from a first camera are analyzed using the inclusion technique, and objects associated with transactions recorded from a second camera are analyzed using the mutual exclusion technique.

8. A method for analyzing video metadata relating to one or more transactions at a point-of-sale (POS) device via a system comprising one or more processors and one or more storage devices, the method comprising:
   receiving a feed of video metadata containing information about a video stream corresponding to video events occurring at a customer POS region and video events occurring at a cashier POS region;
   selecting and executing one or more of a plurality of metadata analysis techniques on the video metadata to identify the presence or absence of a customer at the customer POS region during a time window corresponding to a return transaction;
   wherein the one or more selected and executed metadata analysis techniques include at least an inclusion technique that, for a particular transaction, returns an indication of no fraud if an object present in the video metadata, during the time window associated with the return transaction, is determined to overlap with the customer POS region by more than a predetermined percentage of the customer POS region.

9. A method according to claim 8, wherein the metadata includes information descriptive of objects and events in the video at the POS.

10. A method according to claim 9, wherein the metadata includes information relating to one or more of position, relative size, and movements of an object detected in the video.

11. A method according to claim 10, wherein a detection of the absence of a customer at the POS location associated with the customer is an indication of fraud, the system further comprising a poster application that posts a report of fraud to the POS location upon a detection of fraud.

12. A method according to claim 11, wherein the one or more selected and executed metadata analysis techniques further include:
   a mutual exclusion technique that, for a particular transaction, returns an indication of fraud if an object present in the cashier POS region overlaps the customer POS region by more than a predetermined percentage.

13. A method according to claim 12, wherein objects associated with transactions from a first return lane are analyzed using the inclusion technique, and objects associated with transactions associated with a second return lane are analyzed using the mutual exclusion technique.

14. A method according to claim 12, wherein objects associated with transactions recorded from a first camera are analyzed using the inclusion technique, and objects associated with transactions recorded from a second camera are analyzed using the mutual exclusion technique.

* * * * *